US010110632B2

(12) United States Patent
Li et al.

(10) Patent No.: US 10,110,632 B2
(45) Date of Patent: Oct. 23, 2018

(54) METHODS AND SYSTEMS FOR MANAGING SECURITY POLICIES

(75) Inventors: Hong C. Li, El Dorado Hills, CA (US); Ravi Sahita, Beaverton, OR (US); Satyendra Yadav, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1608 days.

(21) Appl. No.: 10/404,978

(22) Filed: Mar. 31, 2003

(65) Prior Publication Data

US 2004/0193912 A1      Sep. 30, 2004

(51) Int. Cl.
   *H04L 29/06*     (2006.01)
   *G06F 21/55*    (2013.01)
   *H04L 12/24*    (2006.01)

(52) U.S. Cl.
   CPC .............. *H04L 63/20* (2013.01); *G06F 21/55* (2013.01); *H04L 41/085* (2013.01); *H04L 41/0816* (2013.01); *H04L 41/0856* (2013.01); *H04L 63/1441* (2013.01); *H04L 41/0893* (2013.01)

(58) Field of Classification Search
   CPC ............................ H04L 63/20; H04L 63/0227
   USPC ............................ 713/200–202; 709/224–229
   See application file for complete search history.

(56) References Cited

U.S. PATENT DOCUMENTS

| | | | | |
|---|---|---|---|---|
| 5,968,176 | A * | 10/1999 | Nessett et al. | 726/11 |
| 5,978,917 | A * | 11/1999 | Chi | 713/201 |
| 6,282,546 | B1 * | 8/2001 | Gleichauf et al. | 707/102 |
| 6,301,668 | B1 * | 10/2001 | Gleichauf et al. | 713/201 |
| 6,324,656 | B1 * | 11/2001 | Gleichauf et al. | 714/37 |
| 6,380,851 | B1 * | 4/2002 | Gilbert et al. | 340/517 |
| 6,408,391 | B1 * | 6/2002 | Huff et al. | 713/201 |
| 6,415,321 | B1 * | 7/2002 | Gleichauf et al. | 709/224 |

(Continued)

FOREIGN PATENT DOCUMENTS

| | | | | |
|---|---|---|---|---|
| EP | 1143660 | A2 * | 10/2001 | ............. H04L 12/24 |
| EP | 1143660 | A2 | 10/2001 | ............. H04L 12/24 |

(Continued)

OTHER PUBLICATIONS

"Cisco Secure Policy Manager", http://web.archive.org/web/200312094232/cisco.com/warp/public/cc/cisco/mkt/sec, (May 8, 1999), 4 Pg.

(Continued)

*Primary Examiner* — Tamara T Kyle
(74) *Attorney, Agent, or Firm* — Schwegman Lundberg & Woessner, P.A.

(57) ABSTRACT

Methods, machines, and systems manage security policies of heterogeneous infrastructure and computing devices of a network. Security policy repository houses security policies that are pushed over the network by a policy decision point PDP to appropriate security-enabled devices (policy enforcement points (PEPs)) for enforcement. Using a closed feedback loop, a policy feedback point (PFP) collects and processes data from intrusions, alerts, violations, and other abnormal behaviors from a variety of PEPs or logs produced from PEPs. This data is sent as feedback to the policy repository. The PDP detects the data and analyzes it to determine if policy updates (which can be dynamic and automatic) need to be adaptively made and dynamically pushed to PEPs. The PDP can also send console messages or alerts to consoles or administrators.

24 Claims, 3 Drawing Sheets

(56) References Cited

U.S. PATENT DOCUMENTS

| | | |
|---|---|---|
| 6,457,129 B2 | 9/2002 | O'Mahony ............... 713/200 |
| 6,484,261 B1* | 11/2002 | Wiegel ............... 726/11 |
| 6,499,107 B1* | 12/2002 | Gleichauf et al. ............ 713/201 |
| 6,604,100 B1* | 8/2003 | Fernandez et al. ............... 707/3 |
| 6,766,165 B2* | 7/2004 | Sharma et al. ............... 455/423 |
| 2001/0023486 A1 | 9/2001 | Kayashima et al. |
| 2002/0068559 A1* | 6/2002 | Sharma et al. ............... 455/423 |
| 2002/0078382 A1* | 6/2002 | Sheikh et al. ............... 713/201 |
| 2002/0116631 A1 | 8/2002 | Torii et al. |
| 2002/0184525 A1* | 12/2002 | Cheng ............... 713/201 |
| 2003/0084317 A1* | 5/2003 | Cohen ............... 713/200 |
| 2003/0084320 A1* | 5/2003 | Tarquini et al. ............... 713/200 |
| 2003/0084326 A1* | 5/2003 | Tarquini ............... 713/200 |
| 2003/0084330 A1* | 5/2003 | Tarquini et al. ............... 713/200 |
| 2003/0188189 A1* | 10/2003 | Desai et al. ............... 713/201 |
| 2007/0022155 A1* | 1/2007 | Owens et al. ............... 709/202 |

FOREIGN PATENT DOCUMENTS

| | | | | |
|---|---|---|---|---|
| JP | 2000227855 A | 8/2000 | | |
| JP | 2001273388 A | 10/2001 | | |
| JP | 2001521210 A | 11/2001 | | |
| JP | 2002157231 A | 5/2002 | | |
| JP | 2002247033 A | 8/2002 | | |
| JP | 2002251374 | 9/2002 | | |
| JP | 2002251374 A | 9/2002 | | |
| JP | 200385139 A | 3/2003 | | |
| JP | 2003085139 | 3/2003 | | |
| WO | WO-9921017 A1 | 4/1999 | | |
| WO | WO-0214988 A2 | 2/2002 | ............... | G06F 1/00 |
| WO | WO-3096168 A2 | 11/2003 | ............... | G06F 1/00 |

OTHER PUBLICATIONS

"Chinese Application Serial No. 200480008915.1, PCT/US2004/003893, Office Action dated Sep. 19, 2008", 44 pgs.

"International Application Serial No. PCT/US2004/003893, International Preliminary Report on Patentability dated Oct. 1, 2005", 8 pgs.

"International Application Serial No. PCT/US2004/003893, International Search Report and Written Opinion dated Jun. 30, 2004", 14 pgs.

* cited by examiner

METHODS AND SYSTEMS FOR MANAGING SECURITY POLICIES

TECHNICAL FIELD

Embodiments of the present invention relate generally to automated security management, and more particularly to providing automated management for security policies.

BACKGROUND INFORMATION

As managed networks continue to grow; security policy management has become a growing concern. Generally, an organization's network includes a plurality of security-enabled devices, such as routers, switches, firewalls, gateways, hubs, network bridges, clients, peripherals, servers, and the like. Various applications can also be security-enabled on each of the available network devices. Network management techniques use security policies for these devices or applications in order to efficiently and securely manage the network.

For example, an Operating System (OS) application may include a security policy where user passwords are required to be at least 6 characters in length. Another application, perhaps executing within the OS or on another device of the network, may include a security policy for user passwords that require passwords having a length of at least 8 characters. Of course security policies can be more generically and comprehensively applied across the network, such as policies that relegate specific network traffic to defined ports on defined devices, policies that require encryption (e.g., Public Key Infrastructure (PKI) techniques and others), policies that restrict access to defined applications/end users, and other policies.

In today's typical enterprise environment, security control for network infrastructure and computing resources predominately consists of many manual tasks, and each task for network security control and configuration is usually a tedious process that typically involves understanding various vendor proprietary mechanisms and policy languages by the network administrators, who then manually map the enterprise's security policies to these proprietary mechanisms. Furthermore the policies are not systematically linked to the intrusions, attacks, and threats faced by the enterprise network. This technique fatally increases the response time and reduces the effectiveness of the enterprise network to continuously adapt to distributed attacks and threat environments, and also causes a loss of time-sensitive data that could potentially be correlated to design optimal countermeasures to attacks for the entire enterprise network.

Today's standard policy-based network management architecture does not include feedback mechanisms that can make a network more adaptive to environmental changes. Accordingly, existing security policy management architectures, which are mostly based on the policy-based network management architectures, discussed above, do not have the ability to provide dynamic security policy feedback and make adaptive policy updates based on any captured security intrusion and/or threat information. Furthermore, there is either none or very limited information sharing between network devices to which same or related security policies are being applied. In addition, there is lack of management architecture that provides a centralized view and policy engine, which provides correlation of data (both input and feedback) from heterogeneous sources in order to facilitate a corresponding intelligent policy deployment.

Therefore, there is a need for improved security policy management within networks. These implementations and techniques should enable a common security policy specification across heterogeneous enterprise networks and be capable of dynamically providing feedback that can be used to dynamically and adaptively manage network security policies.

DESCRIPTION OF THE EMBODIMENTS

Figure 1:
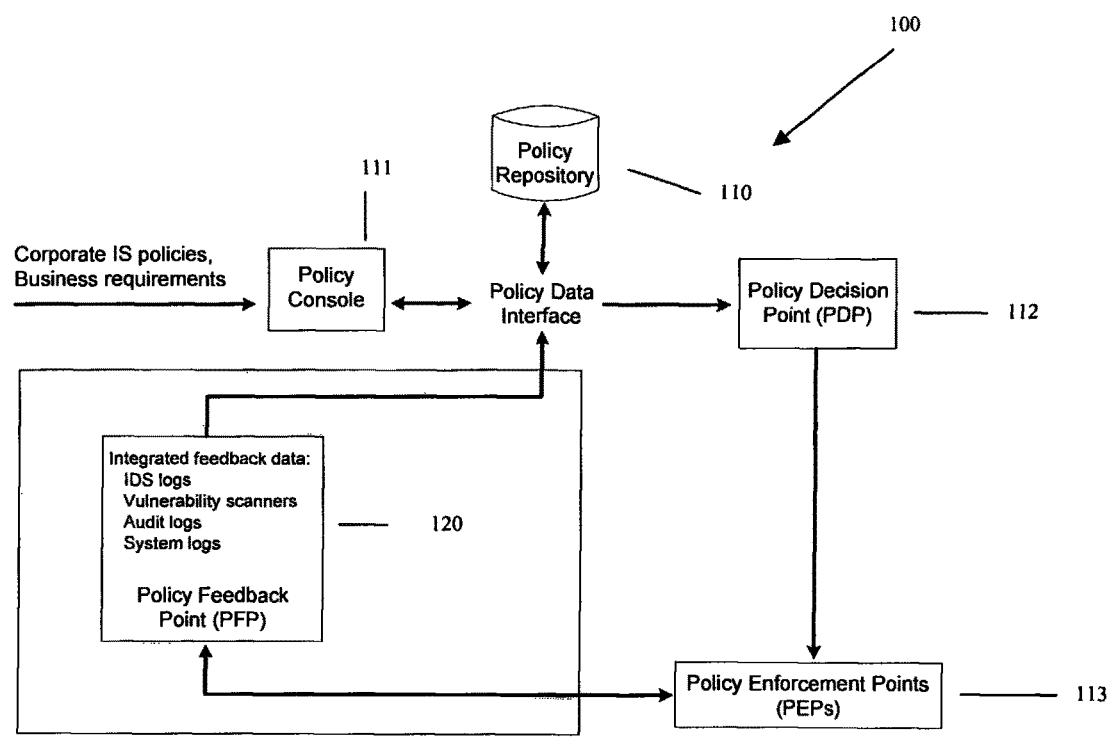
FIG. 1 is a diagram of a security management system, in accordance with one embodiment of the invention.

Novel methods, machines, and systems for managing security policies are described. In the following detailed description of the embodiments, reference is made to the accompanying drawings, which form a part hereof, and in which is shown by way of illustration, but not limitation, specific embodiments of the invention that may be practiced. These embodiments are described in sufficient detail to enable one of ordinary skill in the art to understand and implement them. Other embodiments may be utilized and structural, logical, and electrical changes may be made without departing from the spirit and scope of the present disclosure. The following detailed description is, therefore, not to be taken in a limiting sense, and the scope of the embodiments of the inventions disclosed herein is defined only by the appended claims.

A security-enabled device is any processing device or peripheral device in communication with a network. Moreover, a security-enabled device need not be a physical device since in some instances the security-enabled device can be a software application representing a logical device. Correspondingly, for purposes of various embodiments of the present invention, a security-enabled device includes physical network devices and logical (e.g., application) network devices.

Security policies define security processes, limitations, and/or logic to be enforced on one or more of the security-enabled devices of the network. The security policies can be represented in a variety of data formats; some of these data formats can be directly consumed or executed by a number of the security-enabled devices. In some embodiments, a security policy is a script written in an interpretive programming language (e.g., one that can be executed without compilation and static linking), which is executed by a security-enabled device in order to enforce security limitations on the security-enabled device. In other embodiments, the security policies can be parsed as input files that drive existing security logic for applications processing on a security-enabled device. In yet more embodiments, the security policies are input parameter values for security applications processing on a security-enabled device. Moreover, the data format of the security policies can be provided to each security-enabled device in a format required by each security-enabled device.

The security policies are centrally stored in a policy repository and managed and distributed from a policy decision point. A repository can be a single database, a collection of databases comprising a data warehouse, an electronic file, any other storage location in a computer accessible medium. The repository includes one or more existing or custom-developed interface languages (e.g., Structured Query Language (SQL), Lightweight Directory Access Protocol (LDAP), and others) that permit the security policies in the repository to be queried and updated. Additionally, one or more interface applications can be developed in the interface languages to provide automatic of manual queries and updates to the policy repository.

In one embodiment of the present invention, the security policies are stored in a relational database in a native Extensible Markup Language (XML) format. The interface language to access the policy repository is SQL, and one or more custom search and edit applications written in SQL permit desired security policies to be retrieved and modified within the policy repository. These custom search and edit applications can be self-executing applications or applications that interface with an end user who is administering or monitoring the security policies.

Initially, the policy repository can be populated by transforming an organization's written security policies into a formal electronic representation that represents and uniquely identifies the policy within the policy repository. In some embodiments, this conversion is performed by a database or repository administrator with the assistance of a network security administrator for the organization's network. A single written policy may translate to a variety of separate sub-policies when converted to a formal representation within the policy repository.

In one embodiment, the data format of the initial formal representation of the security policies within the policy repository are embodied in an intermediate data language format (e.g. XML, and others). Furthermore, a variety of policy translators can be individually developed to render the intermediate data language format of a specific security policy into a data format that can be consumed by a specific security-enabled device.

Thus, the security policies, in some embodiments, are singular stored and represented within the policy repository, but can still be rendered into a variety of data formats needed by a variety of security-enabled devices. In one embodiment, the policy translators are implemented as Extensible Style Sheet Language Transformation (XSLT) applications, which use one or more Extensible Style Sheets (XSL) to render the security policies represented as XML in the policy repository to a specific data format required by individual security-enabled devices. A variety of programming languages and techniques can be used to provide translations from the intermediate data format of the security policies to specific data formats required by specific security-enabled devices. All such implementations are intended to be included with embodiments of the present invention.

FIG. 1 illustrates a diagram of a security management system 100, according to one embodiment of the present invention. The security management system 100 is embodied in a computer readable medium within a networked environment. The security management system 100 includes a policy repository 110, a Policy Decision Point (PDP) 112, Policy Enforcement Points (PEP) 113, and a Policy Feedback Point (PFP) 120.

The policy repository 110 houses security policies. Moreover, the policy repository 110 interfaces with policy consoles 111 and PDP 112 through a policy data interface. This allows administrators to query, view, and modify policies in the policy repository 110.

The PDP 112 pushes security policies to one or more PEPs 113. A PEP 113 is a security-enabled device interface that participates in a security network. Thus, a PEP 113 can be an application or a device, such as a server, firewall, router, or any other computing device accessible over the network. The PDP 112 can interface with a PEP 113 using a transport protocol interface and data format (e.g., COPS (Common Open Policy Service Protocol), SNMP, SSH (Secure Socket Shell)/Telnet, other CLIs) to communicate security policies that are to be enabled and enforced on the PEP 113.

The PFP 120 is a feedback point designed to dynamically link the network security policies with the threat environment so that to make the managed network adaptive and more resilient. The PFP 120 includes integrated feedback information obtained from intrusion detection systems (IDS), vulnerability scanners, and the like, which can all be PEPs themselves The PFP can include modules designed to interface with specific security-enabled devices being used in the network. Thus, pieces of the PFP can communicate in IDMEF, SNMP, or any other CLI or protocol required by a security-enabled device within the network.

The PFP 120 normalizes the acquired security threat information and communicates the information to PDP 112, which then translate the normalized information according to requirements dictated by a policy schema used for security policy records in the policy repository, updates the policy repository 112 through the policy data interface, and make the update available to the policy console 111. In some embodiments, the updated changes to the policy repository 110 are then automatically communicated to or discovered by the PDP 112, and an analysis is performed based on predefined conditions and thresholds. In other embodiments if human intervention is not necessary before pushing the updated policies to the PEPs, the analysis can result in dynamic and adaptive changes to a number of security policies included within the policy repository 110, and automatically pushed by the PDP 112 to one or more PEPs 113. In other embodiments, alerts or notifications are sent to the appropriate personnel regarding suggestive policy changes or events that are detected by the PDP 112.

The PFP 120 feedback loop in security management system 100 permits dynamic and adaptive security policy management. Conventional security management systems lack a dynamic and adaptive feedback loop, and thus cannot timely protect the network by updating policies that based on events and data that indicate a network is under attack, or vulnerable and susceptible to intruders or attacks.

For example, when a network intrusion such as SQL Slammer is detected by an IDS (which is one of the PEPs), such intrusion will be collected by the PFP and passed on the PDP, who upon receiving such feedback issues a revised policy to all the affected security-enabled devices to temporarily deny port access to the problem application or resources. Thus, the policy management techniques of embodiments of the present invention are adaptive and can dynamically adjust based on changing circumstances within a network.

One now appreciates through the description presented above, how the improved method 100 can be used with security architectures to better manage security policies. The security policies are adaptively and dynamically changed, translated, monitored, and enforced on a plurality of disparate security-enabled devices. On the other hand, traditional approaches rely on manual intervention for security policy alterations, using a variety of proprietary tools and specialized staff to address different problems that can arise.

Traditional approaches also lack dynamic feedback that can capture, in a time-sensitive manner, transient data or events being raised by a security-enabled device in order to timely detect threats or vulnerabilities faced by a network. By automating and creating a more dynamic and adaptive security management technique, the embodiments of the present invention can timelier and efficiently correct and manage organizational security-enabled devices and security policies.

Figure 2:
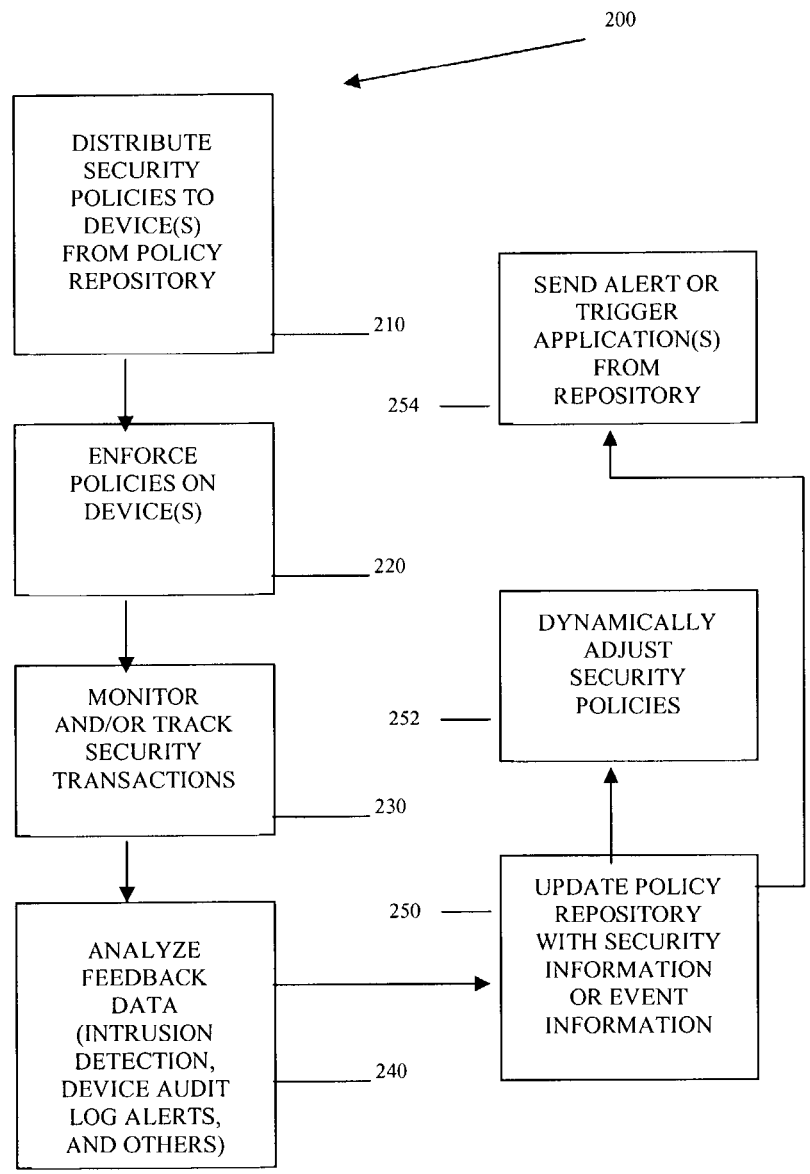
FIG. 2 is a flow diagram of a method for managing security policies, in accordance with one embodiment of the invention.

FIG. 2 illustrates a flow diagram of another method 200 for managing security policies, in accordance with one embodiment of the invention. Method 200 is accessible via computer accessible media and can be distributed across a plurality of processing devices or centralized on a single processing device accessible over a network. The method 200 can be implemented using software and/or firmware. Security-enabled devices are any processing devices capable of enforcing security policies, such as, but not limited to, routers, network hubs, network bridges, switches, gateways, clients, servers, stand alone intelligent appliances, computing peripherals, and the like. The security-enabled devices are interfaced over a network, the network can be hardwired, wireless, or a combination of hardwired and wireless.

Security policies are centrally stored in a policy repository. The data format of the security policies is in an intermediate format that is translated to formats that can be consumed and enforced on each of the security-enabled devices of the network. In one embodiment, the intermediate format is XML, and the policy repository is a database or directory where access is achieved using applications written in SQL or LDAP. The security policies are scripts, parameters, or files that are consumed by security enforcing applications residing on the security-enabled devices.

One or more policy decision translators interact with the policy repository to acquire, distribute, or push security policies to the appropriate security-enabled devices over the network. The policy decision translators include logic to convert the intermediate data format of the security policies to needed data formats that can be used by each of the security-enabled devices. Thus, at 210, security policies are distributed or pushed from the policy repository to the security-enabled devices for enforcement.

Once the security-enabled devices have the security policies in a usable data format, then, at 220, the security policies are dynamically installed and enforced on the security-enabled devices. Some PEPs include logic to monitor and capture security audit information and reports or raises events associated with a variety of security events occurring in the network. Moreover, these PEPs will include CLIs, Application Programming Interfaces (APIs), or specialized protocols that permit different types of security log information or reported security events to be captured and provided upon request. For example, some security-enabled device applications may support IDMEF, and others may support SNMP. Of course a variety of other commands and interfaces can also be used by a security-enabled device application. All such variant commands, interfaces, and protocols are intended to be included with the embodiments of the present invention.

A centralized policy feedback application or a Policy Feedback Point (PFP) module monitors and tracks, at 230, the security threat information or event information. Different components of the PFP are designed to communicate with the CLIs, APIs, and/or protocols recognized by specific security-enabled device applications. The PFP can also aggregate and process security log information or event information obtained from the various security-enabled devices. The security log information or event information s then normalized or translated, at 240, by the PFP into a data format recognized or needed by the PDP. Once the security log information or event information is normalized, and processed, it is updated to the policy repository at 250.

The normalized feedback information is linked or associated with the appropriately affected security policies within the policy repositories. This can be achieved by the policy feedback application having knowledge of which security policies are processing on which security-enabled devices. Alternatively, the security policies can be identified by the PFP by querying the policy repository with security-enabled device identifications. In still other instances, the security log information can include security policy identifiers. A variety of techniques exist for the PFP to appropriately link portions of the acquired security log information or event information with the appropriately affected security policies in the policy repository.

The PDP can be equipped with triggers or event applications, such that when a security policy record is updated with security log information or event information a number of specialized policy decision translators are automatically executed. In other embodiments, a number of policy decision translators are configured to continually process or process at configurable time intervals to inspect security log information or event information being updated to security policy records within the policy repository.

The specialized policy decision translators are designed and configured to evaluate the security feedback information and to take action based on defined thresholds or events that are detected. In some cases, a policy decision translator can alter or temporarily change a security policy within the policy repository and push the change dynamically to the affected security-enabled devices. Thus, the policy decision translators can effectuate adaptive and dynamic security policy changes, as depicted at 252. In other embodiments, a policy decision translator can dynamically and automatically send an alert or trigger a number of other applications to execute from the policy repository, as depicted at 254. Alerts can be sent when policy changes are made and/or when no policy change occurs but it is deemed necessary to notify an appropriate end user, such as a network security administrator. In still other embodiments, the specialized policy decision translators can include informative information or suggestive policy change information in the alert being sent to an appropriate end user.

Thus, policy decision translators can be used to render the security policies into security-enabled device specific data formats from the policy repository, and used to evaluate updated security log information or event information associated with a specific security policy within the policy repository. The evaluation can lead to no action by a policy decision translator, a dynamic security policy change, and/or an alert being sent with informative or suggestive information included within the alert. Moreover, in some instances, additional specialized applications can be triggered and automatically processed by a policy decision translator based on evaluation of the security log information or event information.

Evaluations can include detection of security violations, intrusions, security threats, security vulnerabilities, abnormal conditions or traffic occurring on a security-enabled device, or any other event or circumstances that is desirable to evaluate. Evaluations are limited only by the available information contained in the security log information or events reported and captured on the security-enabled devices. Thus, specialized policy decision translators can be designed and implemented according to the knowledge, experience, and requirements of an organization in order to achieve a desired level of security management.

Furthermore, in some embodiments, the policy repository includes a number of policy authoring and editing applications that can be automatically processed by a policy decision translator or manually used by an end user, such as a network security administrator. Thus, a network's security policies can be centrally managed, distributed, modified, and monitored with various teachings of the embodiments for the present invention. These teachings alleviate the manually intensive and ad hoc techniques presently used to manage network security policies. Thus, with embodiments of the present invention a more adaptive, dynamic, and efficient management of network security can be achieved. Moreover, security policies and transactional information is used to provide dynamic feedback that can lead to adaptive changes without manual intervention in order to secure the network.

Figure 3:
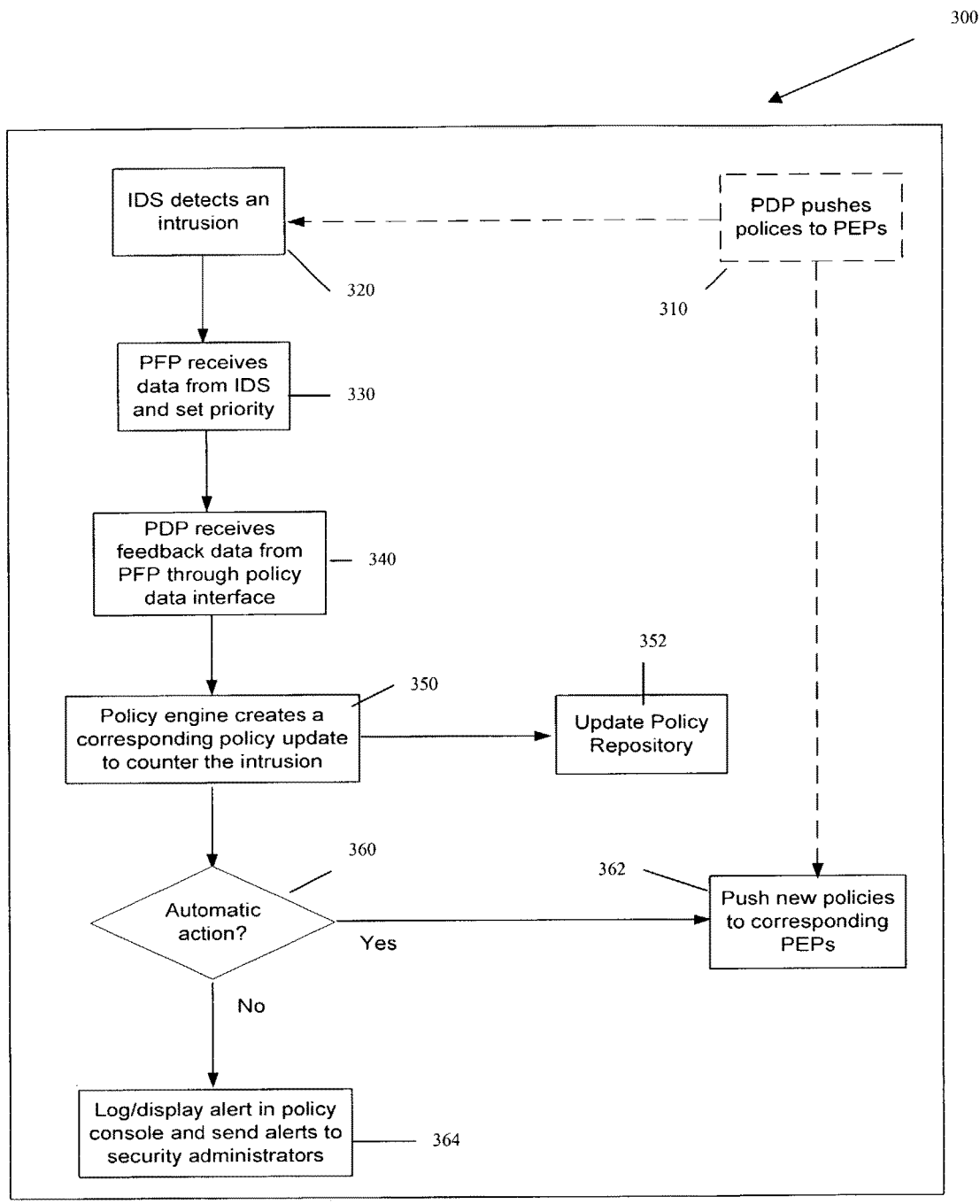
FIG. 3 is a flow diagram of another method for managing security policies, in accordance with one embodiment of the invention.

FIG. 3 illustrates a diagram of another method 300 for managing security policies, in accordance with one embodiment of the invention. Method 300 is implemented within a variety of computer accessible media in a computer network environment. The network includes a number of physical or logical devices referred to as Policy Enforcement Points (PEP). PEP is any device capable of enforcing and tracking security transactions, such as peripheral devices, processing devices, and others. Moreover, a policy repository includes information regarding security transactions occurring on the network PEPs and security policies being managed over the network on a variety of the PEPs.

A Policy Decision Point (PDP) application or module pushes security policies from the policy repository at 310 affected PEPs, at initialization or during management and operation of the network when security policies are changed or modified dynamically in the policy repository.

During operation of the network, the security policies are dynamically enforced and operated upon in order to report and track security transactions occurring on PEPs. Accordingly, at 320, in some embodiments, an Intrusion Detection System (IDS) detects an unauthorized intrusion or other network vulnerability on one of the PEPs. At 330, a Policy Feedback Point (PFP) receives the security transactional data from the IDS and sets a priority for the received data. Next, at 340, the PDP receives the feedback data from the PFP through a policy data interface or indirectly through updates to the policy repository with the new security transactional data.

At 350, a policy engine creates any needed policy updates to the policy repository based on the security transactional data and its set priority. Policy changes can be adaptively and dynamically made with the network in order to dynamically counter intrusions or other attacks on the network and/or PEP. Accordingly, when policy changes are adaptively made then at 352 the policy repository is automatically updated.

At 360, a check is made to determine if a policy change requires automatic action on the part of a PDP, and if the dynamic policy change was made and automatic action is required, then, at 362, the new policy changes are pushed to the appropriate PEPs and dynamically loaded and executed on the appropriate PEPs. If no dynamic policy change is desired, then, at 364, a proper log/display alert in a policy console appears and automatic alerts can be optionally sent to policy administrators.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

What is claimed is:

1. A method comprising:
dynamically detecting, on a first security device, security information obtained from a second security-enabled device over a network connection between the first security device and the second security-enabled device, wherein the security information is related to activity occurring on the second security-enabled device detected by a security mechanism of the second security-enabled device and produced in a first data format specific to the security mechanism that is already processing on the second security-enabled device;
normalizing the security information from the first data format into an intermediate data format before being processed by the first security device;
recording the normalized security information in a data repository; and
dynamically pushing from the first security device a security policy in response to the normalized security information to the second security-enabled device over the network in the first data format for enforcement on the second security-enabled device, and wherein enforcement occurs on the second security-enabled device, and wherein the security policy is an executable script and the security-enabled device automatically and dynamically executes the executable script to provide adaptive and dynamic security policy detection and enforcement.

2. The method of claim 1 further comprising triggering a security policy change associated with a security policy based on at least a portion of the recorded normalized security information.

3. The method of claim 1 further comprising evaluating the security policy based on at least a portion of the recorded normalized security information.

4. The method of claim 1 wherein in detecting, the security information is detected using at least one of a security transaction protocol and a security transaction command line interface.

5. The method of claim 1 wherein in detecting, the security information is associated with at least one of security intrusions, security alerts, security violations, and abnormal behaviors occurring on the second security-enabled device.

6. The method of claim 1 wherein in recording, the normalized security information provides dynamic policy feedback to one or more security policies.

7. A method, comprising:
dynamically and centrally distributing security policies from a policy repository on a first device to one or more security-enabled devices, wherein the policy is distributed as a file or parameters and in specific recognized formats by existing security mechanisms processing on the one or more security enabled devices;
dynamically enforcing a number of the security policies on one or more of the security-enabled devices;
dynamically tracking security transactions on each of the one or more security-enabled devices, wherein each of the one or more security-enabled devices use its own security mechanism to record its security transactions in its own specific data format and normalizing security information associated with the security transactions before processing the security transactions;
updating the policy repository on the first device based on the tracked security transactions; and
dynamically pushing a dynamically created or dynamically altered security policy to one or more of the security-enabled device from the first device in response to the updated policy repository in the specific formats recognized by the one or more security-enabled devices, the altered security policy is a script and each of the one or more security-enabled devices automatically and dynamically execute the script to provide adaptive and dynamic security policy enforcement.

8. The method of claim 7 wherein in distributing, the policy repository is at least one of a data warehouse, a database, and an electronic file.

9. The method of claim 7 wherein in distributing, the one or more security-enabled devices include at least one of a firewall, a router, a switch, a network bridge, a gateway, a network hub, a client, a peripheral device, a security resource, an intrusion detection system, and a server.

10. The method of claim 7 wherein in tracking, one or more automated applications detect when a security violation occurs on one or more of the security-enabled devices and traps security information for the security violation.

11. The method of claim 7 wherein in updating, the recorded security transactions are translated into a normalized data format before being updated to the policy repository.

12. A system, comprising:
a policy repository having one or more security policies for a network and administered from a first device over a network;
a security-enabled device to enforce one or more of the security policies dynamically provided from the policy repository via the first device, the security policies are scripts and the security-enabled device automatically and dynamically is to execute the scripts to provide adaptive and dynamic security policy enforcement, wherein the security enabled device is externally accessed over the network from the first device, and wherein the security-enabled device uses its own security mechanism to monitor and capture information about security transactions occurring on the security-enabled device and has its own specific data format for monitoring and capturing the information and wherein the security policies are supplied in that specific data format to the security mechanism;
a feedback application to dynamically monitor security transactions on the security-enabled device and to dynamically update the policy repository on the first device with security information based on the security transactions, and wherein security information associated with the security transactions are normalized into a normalized data format before the feedback application processes the security transactions.

13. The system of claim 12 further comprising one or more policy decision point translators to push the one or more security policies from the policy repository to the security-enabled device for enforcement.

14. The system of claim 13 wherein the one or more policy decision point translators retrieve the one or more security policies from the policy repository in an intermediate data format and use translator applications to translate the one or more security policies to a desired data format used by the security-enabled device for enforcement.

15. The system of claim 12 wherein the policy repository is a collection of data stores logically assembled as the policy repository based on a specific schema.

16. The system of claim 15 wherein a number of the data stores are remote from other ones of the data stores.

17. The system of claim 12 wherein feedback application utilizes security protocols of the security-enabled device to monitor security events on the network.

18. The system of claim 12 wherein the feedback application normalizes the security information into a data format used by the policy repository before updating the policy repository with the security information.

19. A non-transitory machine-readable medium having executable instructions that when executed by a machine, perform a method to:
dynamically push security policies from a policy repository on a first device to one or more security-enabled devices over a network in data formats specifically recognized and used by the one or more security-enabled devices, the policy is a script and each of the one or more security-enabled devices is to automatically and dynamically execute the script to provide adaptive and dynamic security policy enforcement;
dynamically enforce, by the one or more security-enabled devices, the security policies in each of the data formats recognized and used;
dynamically monitor security events occurring on the managed network from the first device, wherein the security events are independently captured by each of the one or more security-enabled devices in each of the one or more security-enabled device's data format;
dynamically normalize security information associated with the security events on the first device before the security information is processed, wherein the each independent data format for the security events are normalized to a intermediate format before being processing by the first device; and
dynamically update the policy repository with the normalized security information on the first device, and wherein in response to the normalized security information a policy decision translator sends an alert with policy change information included within the alert when no change occurs in existing policy and when an end-user is to be notified of a suggested policy change via the policy change information, wherein the end-user is associated with the first device.

20. The non-transitory machine-readable medium of claim 19 further comprising, instructions to:
use at least a portion of the updated normalized security information to adjust a number of the security policies.

21. The non-transitory machine-readable medium of claim 20 further comprising, instructions to:
    trigger from the policy repository a number of security-related applications for execution based on at least a portion of the updated normalized security information.

22. The non-transitory machine-readable medium of claim 19 wherein in the push instruction, the policy repository interfaces with security editing applications.

23. The non-transitory machine-readable medium of claim 19 wherein in the monitor instruction, native security protocols and commands used by the security-enabled devices are used to acquire the security information associated with security events occurring on the managed network.

24. The non-transitory machine-readable medium of claim 19 wherein in the normalize instruction, the security information is translated from a native data format to an intermediate data format used by the policy repository.

* * * * *